Feb. 14, 1956  J. MESSINA  2,734,739
LOADING DOCK BUMPER
Filed Oct. 29, 1951
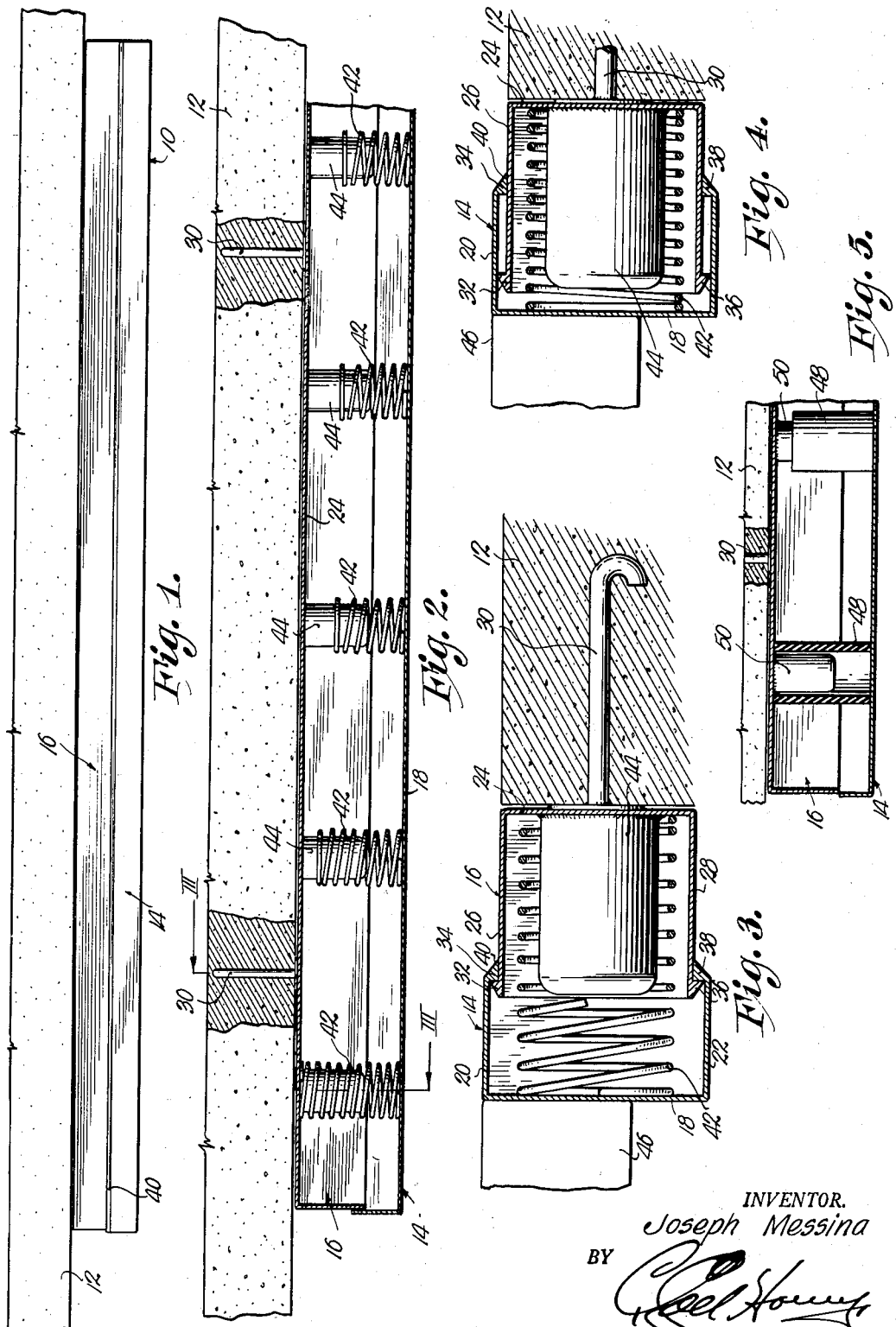
INVENTOR.
Joseph Messina
BY
ATTORNEY.

United States Patent Office 2,734,739
Patented Feb. 14, 1956

2,734,739
LOADING DOCK BUMPER

Joseph Messina, Kansas City, Mo.

Application October 29, 1951, Serial No. 253,731

2 Claims. (Cl. 267—1)

This invention relates to bumpers for loading docks, the primary object being to provide a loading dock attachment capable of absorbing the shock of trucks as the same are backed or otherwise moved into position adjacent the dock for loading.

Loading docks generally are provided with relatively heavy plank and block structure against which trucks and other vehicles are moved oftentimes in alignment with warehouse doors for loading and unloading of the trucks, trailers or other means of conveyance. Such provision of plank structure and the like is entirely unsatisfactory for the reason that the same will not withstand the damage that is occasioned by being constantly bumped, and furthermore, even if the dock itself and its foundation are constructed and reinforced with heavy material, the same usually breaks down after a relatively short period of time and becomes in need of repair or replacement.

Accordingly, it is the most important object of the present invention to provide a bumper including resilient means to absorb the shock, thereby eliminating the necessity of providing expensive, strong construction in the dock itself.

Another object hereof is to provide a bumper that is universally adapted for attachment to virtually any type of loading dock and that may be placed in use over long periods of time without need of renewal.

A still further object of this invention is to provide a bumper to provide not only the loading dock and the trucks and trailers, as well, and including a pair of relatively shiftable members held biased apart by resilient means capable of yielding to the shock of the truck as the same is backed thereagainst toward the dock.

Another object hereof is to provide a loading dock bumper wherein the aforesaid, relatively shiftable members are held biased apart by resilient means having progressively increased resistance as the ends of the bumper are approached.

Other objects include details of construction such as the provision of stops that limit the extent of movement of the bumper sections away from each other; the inclination of the stops to avoid projecting shoulders particularly at the uppermost surface of the bumper; and to provide springs, rubber-like elements or the like to yieldably hold the members spaced-apart until a vehicle is moved thereagainst as aforesaid.

In the drawing:

Figure 1 is a top plan view of a loading dock bumper made pursuant to the present invention.

Fig. 2 is an enlarged, fragmentary view similar to Fig. 1, parts being broken away and in section to reveal details of construction.

Fig. 3 is an enlarged, fragmentary, cross-sectional view taken on irregular line III—III of Fig. 2.

Fig. 4 is a view similar to Fig. 3 illustrating one of the springs in a compressed condition; and Fig. 5 is a view similar to Fig. 2 illustrating a slightly modified form of loading dock bumper.

In the preferred embodiment of my present invention as illustrated in Figs. 1 to 4 inclusive of the drawing, a loading dock bumper broadly designated by the numeral 10 is shown mounted in place upon a loading dock 12 that is preferably made of concrete as is clear in Figs. 2, 3 and 4.

Bumper 10 includes a pair of elongated, hollow channel members 14 and 16 that are relatively telescoped for movement toward and away from each other. Each channel member 14—16 is U-shaped in cross-section presenting a bight 18 and a pair of parallel legs 20 and 22 for the channel member 14 extending laterally from and perpendicular to the bight 18.

The elongated channel member 16 that is disposed within the member 14 is likewise provided with a bight 24 and a pair of parallel legs 26 and 28. Bights 18 and 24 are vertical, whereas the legs 20, 22, 26 and 28 are all substantially horizontal.

Any suitable means may be provided for attaching the bumper 10 to the loading dock 12 and in the instance illustrated, the bight 24 of the member 16 has a plurality of hooks 30 secured to the outermost face of the bight 24 thereof and extending horizontally into the concrete dock 12 within which the same is embedded. The bumper 10 is preferably disposed relative to the dock 12 with the uppermost face of leg 26 flush with the uppermost face of the dock 12 as indicated in Figs. 3 and 4 of the drawing.

The legs 20 and 26 are provided with ribs 32 and 34 respectively at the free edges thereof and extending throughout the length of the members 14 and 16, ribs 32 and 34 being normally interengaged and cooperating with similar ribs 36 and 38 to limit the extent of movement of the members 14 and 16 away from each other. The ribs 32, 34, 36 and 38 are preferably triangular-shaped as illustrated in Figs. 3 and 4, it being particularly important that rib 34 be thus provided with an inclined, uppermost surface 40 to eliminate sharp protruding projections or shoulders on the uppermost face of the bumper 10. Thus, as merchandise is moved to and from a warehouse over the dock 12 and over the bumper 10, the latter will not hinder free sliding of the merchandise or free rolling of carts, trucks and the like that are commonly used in this field.

In the modification illustrated in Figs. 1 to 4 inclusive, the members 14 and 16 are yieldably held biased apart by the provision of a plurality of springs 42 between the bights 18 and 24. It is seen in Fig. 2 of the drawing, showing substantially half of the bumper 10, that the outermost springs 42 are sufficiently long to engage the innermost faces of both bights 18 and 24, and thereby serve to normally hold the ribs 34 and 38 against the ribs 32 and 36 respectively. The springs 42 progressively decrease in length as the center of the bumper 10 is approached. In other words, there are five pairs of springs 42, the two outermost springs 42 being the longest and the two centermost springs 42 being relatively short. Springs 42 are guided and held in place through the medium of a stub pin 44 on the innermost face of the bight 24 and extending toward the bight 18. It is to be preferred that the pins 44 be shorter than the width of the legs 26 and 28 to the end that when the member 14 is forced to the innermost end of its path of travel toward the dock 12, the bight 18 will engage the innermost edges of the legs 26 and 28, such edges presenting stops extending the entire length of the bumper 10.

It is now clear that when a truck or trailer is moved against the bight 18, Fig. 4 illustrating bed 46 of such vehicle engaging the bight 18, member 14 will be shifted toward the dock 12 against the action of springs 42. During such movement, the ribs 34 and 38 slide along the outer faces of the legs 26 and 28, and the ribs 32 and 36 slide along the inner faces of the legs 20 and 22.

The bumper illustrated in Fig. 5 of the drawing is identical with bumper 10 as above described, with the exception only that in lieu of springs 42, there is provided a plurality of tubular rubber or rubber-like elements 48 telescoped on pins 50 comparable to the pins 44, and the elements 48 likewise progressively increase in length as the ends of the bumper are approached. The provision in the bumper, whether the same takes the form of Figs. 1 to 4 inclusive or that of Fig. 5, of progressively increased resistance to inward movement of the outermost channel member as the ends of the bumper are approached, is extremely important when it is realized that trucks and trailers of differing sizes and weights will be moved thereagainst and with differing degrees of force depending upon the care of the driver in aligning his truck with the dock itself. In other words, if the springs 42 or the rubber tubes 48 were all of the same length, and acted upon the reciprocable channel member with such force as to withstand heavy loads or jars that could be expected in everyday use of the bumper, then the bumper would become ineffective when light loads or lighter trucks were backed thereagainst or even heavier trucks with less force and speed. Through this construction, the bumper is always operable to provide a resilient cushioning for varying degrees of force and pressures exerted against the bight of the outermost reciprocable channel member.

In operation therefore, when a light-weight truck is backed against the bumper, the outermost springs 42 absorb the shock and as increased force or pressure is applied, the remaining springs progressively act to absorb the shock. All ten springs become active only under the most severe conditions involving exceptionally large vehicles or instances where the driver negligently backs the truck toward the dock at high speed. The same action takes place in the case of the modification of Fig. 5, utilizing rubber elements 48. It is realized that in lieu of the differing lengths of the springs 42 or the rubber elements 48, the tension or ability to withstand force on the part of springs 42 or tubes 48 may progressively increase as the ends of the respective bumpers are approached. The effect is the same so far as providing a variable resistance to inward movement of the outer channel member toward the innermost channel member. It is manifest also, that in lieu of the inner channel member being fastened to the dock, hook elements 30 or other fastening devices, may be mounted on the bight 18 and in the same respect, it is immaterial whether the pins 44 or 50, as the case may be, are mounted on the bight 24 or the bight 18. Elimination of the pins 44 and 50 may be effected by fastening the elements 42 or 46 directly to one of the two bights.

It is noted in Figs. 1, 2 and 5, that the ends of the channel members are in overlapping relationship to hold the same against relative shifting movement on their longitudinal axes, presenting therefore, a completely closed, hollow structure.

Having thus described the invention what is claimed as new and desired to be secured by Letters Patent is:

1. In a loading dock bumper, a pair of elongated U-shaped channel members disposed in facing relationship and each having a bight and a pair of spaced legs perpendicular to the bight, the legs of one of the members being telescoped between the legs of the other member for free sliding movement of the members toward and away from each other; stop means along the edges of said legs for limiting the extent of movement away from each other; a plurality of guide pins within the members and mounted on one of the bights; a tubular elastic compression element on each pin respectively between the bights; and means for mounting the channel members on the vertical face of a loading dock.

2. In a loading dock bumper as set forth in claim 1 wherein said stop means consist of oppositely facing and oppositely extending ribs extending longitudinally of the legs throughout the lengths thereof.

References Cited in the file of this patent
UNITED STATES PATENTS

| | | |
|---|---|---|
| 107,036 | Gardiner | Sept. 6, 1870 |
| 149,951 | Palmer | Apr. 21, 1874 |
| 873,221 | Edwards | Dec. 10, 1907 |
| 875,523 | Helmick et al. | Dec. 31, 1907 |
| 1,239,264 | Fitch | Sept. 4, 1917 |
| 1,602,328 | Bluhm | Oct. 5, 1926 |
| 1,640,222 | Slowik | Aug. 23, 1927 |
| 2,027,800 | Whitlock | Jan. 14, 1936 |
| 2,361,496 | Pointer | Oct. 31, 1944 |
| 2,554,657 | Betterton et al. | May 29, 1951 |
| 2,574,410 | O'Connor | Nov. 6, 1951 |
| 2,649,295 | Schuyler | Aug. 18, 1953 |